(12) United States Patent
Kao (10) Patent No.: US 9,314,951 B2
(45) Date of Patent: Apr. 19, 2016

(54) SIMPLE INJECTION MOLDING MACHINE STRUCTURE AND INJECTION METHOD FOR THE SAME

(71) Applicant: Yu-Sheng Kao, Tainan (TW)

(72) Inventor: Yu-Sheng Kao, Tainan (TW)

( * ) Notice: Subject to any disclaimer, the term of this patent is extended or adjusted under 35 U.S.C. 154(b) by 85 days.

(21) Appl. No.: 14/268,079

(22) Filed: May 2, 2014

(65) Prior Publication Data
US 2015/0314505 A1   Nov. 5, 2015

(51) Int. Cl.
*B29C 45/76*   (2006.01)
*B29C 45/20*   (2006.01)
*B29C 45/18*   (2006.01)
*B29C 45/77*   (2006.01)

(52) U.S. Cl.
CPC ............ *B29C 45/20* (2013.01); *B29C 45/77* (2013.01); *B29C 2045/1883* (2013.01)

(58) Field of Classification Search
CPC .. B29C 45/07; B29C 45/08; B29C 2045/1875
USPC ......................................................... 425/594
See application file for complete search history.

(56) References Cited

U.S. PATENT DOCUMENTS

| | | | | |
|---|---|---|---|---|
| 4,904,913 A * | 2/1990 | Jones | .................. | B29C 45/7666 318/560 |
| 5,902,611 A * | 5/1999 | Stegmaier | ........... | B29C 45/5008 425/145 |
| 6,024,560 A * | 2/2000 | Ito | .......................... | B29C 45/07 425/593 |
| 6,613,262 B1 * | 9/2003 | Arend | .................. | B22D 17/005 264/255 |
| 2005/0161847 A1 * | 7/2005 | Weatherall | .............. | B29C 45/77 264/40.1 |
| 2012/0090308 A1 * | 4/2012 | Yuan | ....................... | B29C 45/82 60/327 |
| 2013/0147078 A1 * | 6/2013 | Matsubayashi | ......... | B29C 45/77 264/40.3 |

FOREIGN PATENT DOCUMENTS

JP          05-337977          * 12/1993

OTHER PUBLICATIONS

Plastics Technoloty, "Molder Slashes Energy Cost With Move to Desiccant Drying", James Callari editor, Apr. 2012.*

* cited by examiner

*Primary Examiner* — Jill Heitbrink
(74) *Attorney, Agent, or Firm* — Rosenberg, Klein & Lee (57) ABSTRACT

A simple injection molding machine structure including a stationary platen, a movable platen, and an injection unit, and an injection method for the simple injection molding machine structure are provided. The stationary platen and the movable platen each carry a mold core for defining a mold cavity. The movable platen is movable freely relative to the stationary platen. The injection unit is disposed on the movable platen and includes an injection barrel, a heating member, a screw rod and a driving member. The screw rod is coupled to the driving member, extended into, and received in the injection barrel. The heating member is disposed on the injection barrel. The screw rod pressurizes, injects, and delivers molten plastic. The simple injection molding machine operates by controlling the speed of advancement of the screw rod to stabilize pressure and thus allow the molten plastic to take shape easily.

10 Claims, 6 Drawing Sheets

SIMPLE INJECTION MOLDING MACHINE STRUCTURE AND INJECTION METHOD FOR THE SAME

BACKGROUND OF THE INVENTION

1. Field of the Invention

The present invention relates to simple injection molding machine structures and injection methods for the same, and more particularly, to a simple injection molding machine structure and an injection method for the same, characterized by a screw rod for pressurizing, injecting, and delivering a molten plastic directly, and characterized by controlling the speed of advancement of the screw rod to stabilize pressure, thereby effectuating simple injection.

2. Description of the Prior Art

Conventional injection molding machines for use in plastic processing are equipped with an overly large number of constituent elements and thus are bulky upon assembly. Taiwan Patent 1274653 discloses an injection molding machine which has a mold device, a mold locking device, and an injection device. The mold device comprises a stationary mold and a movable mold. The mold locking device comprises a stationary platform board, a movable platform board, a mold locking-oriented motor, and a toggle mechanism. The mold locking-oriented motor drives a ball screw and thereby drives the toggle mechanism as soon as a crosshead moves forward or backward, so that the movable platform board moves forward or backward to effectuate mold closing, mold locking, and mold opening. The injection device comprises a heating chamber and an injection nozzle. The heating chamber heats up resin fed by a hopper to melt the resin. The injection nozzle injects the molten resin. A screw is disposed in the heating chamber and adapted to rotate freely and move forward or backward freely. The screw is driven with a measurement-oriented motor such that the resin is stored in front of the screw. An injection-oriented motor drives the screw to move forward and thus ejects the resin from the injection nozzle. However, the injection molding machine comprises an overly large number of constituent elements and thus are bulky; as a result, the injection molding machine takes up much space, is inconvenient to transport, is expensive, and requires intricate retrofits and maintenance. Accordingly, there is room for improvement in the conventional injection molding machines in use.

Accordingly, it is imperative to design a simple injection molding machine which is compact and thus easy to transport, is cheap, and requires simple retrofits and maintenance.

SUMMARY OF THE INVENTION

In view of the aforesaid drawbacks of the prior art, the inventor of the present invention conceived room for improvement in the conventional injection molding machines and thus conducted extensive researches to provide a simple injection molding machine structure and an injection method for the same with a view to simplifying constituent elements and enhancing ease of maintenance.

The present invention provides a simple injection molding machine structure, comprising: a stationary platen for carrying a first mold core; a movable platen corresponding in position to the stationary platen, moving relative to the stationary platen freely, and carrying a second mold core corresponding in position to the first mold core, wherein the first and second mold cores engage with each other to enclose a mold cavity; and an injection unit disposed on the movable platen and including an injection barrel having an injection nozzle, a heating member, a screw rod, and a driving member, the screw rod having an end coupled to the driving member and another end extended into and received in the injection barrel, the heating member being disposed on the injection barrel, and the injection nozzle penetrating the movable platen to communicate with the mold cavity.

Furthermore, the simple injection molding machine structure further comprises a mobile feed tank. The injection barrel has a feed port corresponding in position to the injection nozzle. The mobile feed tank communicates with the feed port through a pipeline.

Furthermore, the driving member further comprises a control unit and a variable-frequency motor. The control unit is electrically connected to the variable-frequency motor.

Furthermore, two cylinders each having a power unit and a retractable rod are disposed at two opposing ends of the movable platen, respectively. The power unit is electrically connected to the control unit. The retractable rod penetrates the movable platen to allow an end of the retractable rod to abut against the stationary platen.

Furthermore, the second mold core has therein a runner whereby the injection nozzle and the mold cavity are in communication with each other.

The present invention further provides an injection method for a simple injection molding machine structure, applicable to the simple injection molding machine structure, the injection method comprising the steps of: introducing a plastic raw material into the injection barrel by rotation of the screw rod, followed by heating the plastic raw material until the plastic raw material melts to form a molten plastic; conveying the molten plastic to the injection nozzle by the screw rod, pressurizing the molten plastic at the injection nozzle to eject the molten plastic from the injection nozzle, and eventually delivering the molten plastic into the mold cavity; and controlling a speed of advancement of the screw rod to stabilize a pressure in the injection barrel and a pressure in the mold cavity, thereby allowing the molten plastic in the mold cavity to take shape.

The advantages of the present invention are described below.

1. The simple injection molding machine of the present invention comprises a stationary platen, a movable platen, first and second mold cores, and an injection unit and thus requires less constituent elements than the conventional injection molding machines do; hence the simple injection molding machine of the present invention is compact, cheap, mobile, and easy to carry out maintenance.

2. According to the present invention, the second mold core has therein a runner whereby the injection nozzle and the mold cavity are in communication with each other; hence, the present invention overcomes a drawback of the prior art, that is, a conventional mold relies upon a plurality of runners for dispensing a plastic and thus a considerable amount of the residual molten plastic remains in the runners, thereby resulting in a waste of material.

BRIEF DESCRIPTION OF THE DRAWINGS

The above and other objectives, features, and advantages of the present invention are hereunder illustrated with preferred embodiments in conjunction with the accompanying drawings, in which.

DETAILED DESCRIPTION OF THE EMBODIMENTS

Figure 1:
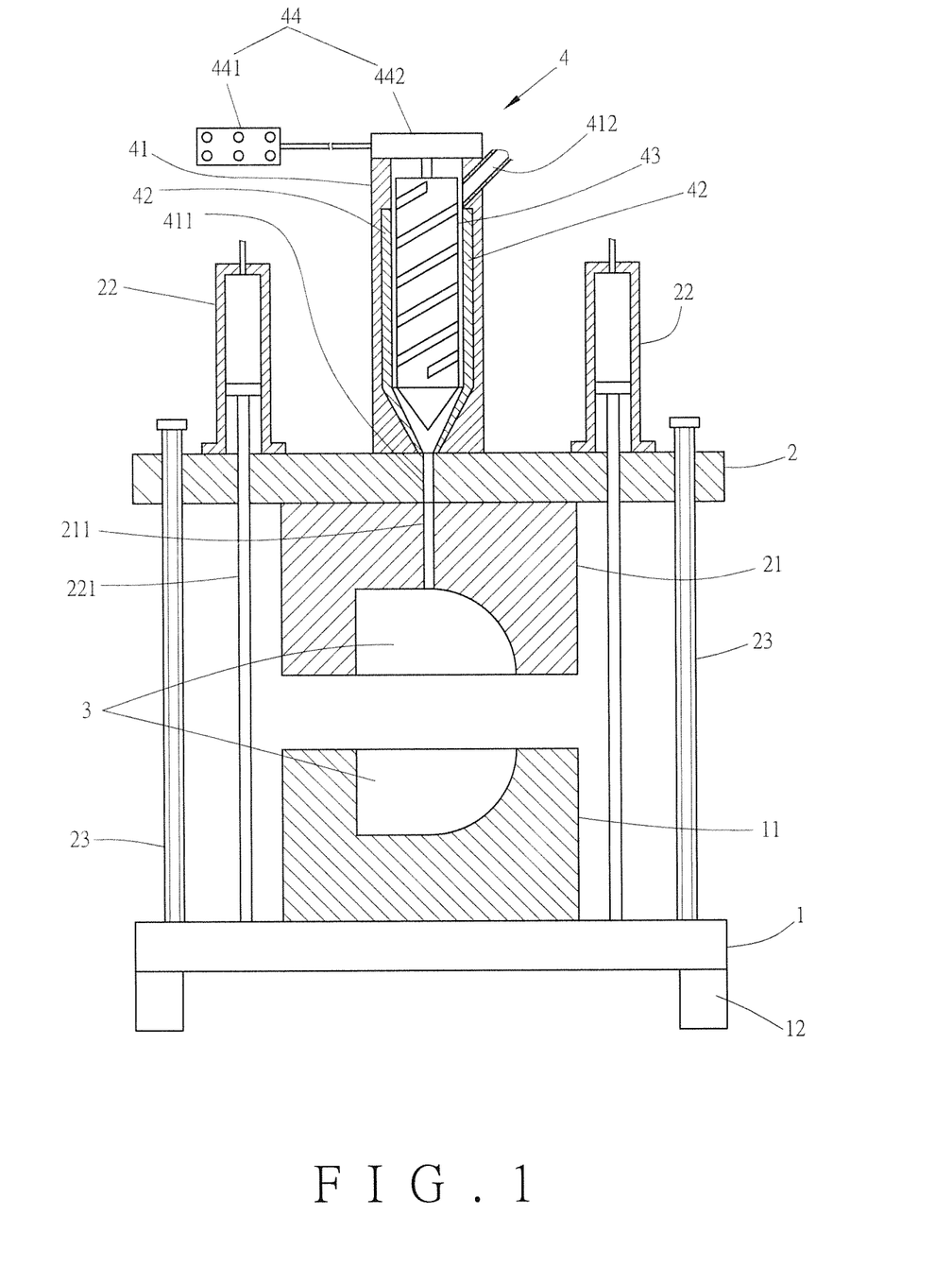
FIG. 1 is a front cross-sectional view of a simple injection molding machine in accordance with an embodiment of the present invention.

Referring to FIG. 1, there is shown a front cross-sectional view of a simple injection molding machine according to an embodiment of the present invention. As shown in the diagram, the present invention provides a simple injection molding machine structure which comprises a stationary platen 1, a movable platen 2, and an injection unit 4. The stationary platen 1 carries a first mold core 11. A plurality of legs 12 is disposed at the bottom of the stationary platen 1. The legs 12 are in contact with the ground to allow the stationary platen 1 to rest steadily on the ground. The movable platen 2 corresponds in position to the stationary platen 1 and is movable relative to the stationary platen 1 freely. The movable platen 2 carries a second mold core 21 corresponding in position to the first mold core 11. The first and second mold cores 11, 21 engage with each other to enclose a mold cavity 3. The injection unit 4 is disposed on the movable platen 2 and comprises an injection barrel 41, a heating member 42, a screw rod 43, and a driving member 44. The screw rod 43 has an end coupled to the driving member 44 and another end extended into and received in the injection barrel 41. The heating member 42 is disposed on the injection barrel 41. The injection barrel 41 has an injection nozzle 411 penetrating the movable platen 2 to communicate with the mold cavity 3. The second mold core 21 has therein a runner 211 whereby the injection nozzle 411 and the mold cavity 3 are in communication with each other. The driving member 44 further comprises a control unit 441 and a variable-frequency motor 442. The control unit 441 is electrically connected to the variable-frequency motor 442 and adapted to control the variation in the rotation speed of the variable-frequency motor 442 and thus adjust the magnitude of the thrust exerted by the screw rod 43 in pressurizing and delivering a molten plastic directly.

Preferably, the simple injection molding machine structure further comprises a mobile feed tank 5. The injection barrel 41 has a feed port 412 opposite the injection nozzle 411. The mobile feed tank 5 communicates with the feed port 412 through a pipeline 51.

Preferably, two cylinders 22 are disposed at two opposing ends of the movable platen 2, respectively. The movable platen 2 is penetrated by at least two guiding rods 23 which guide the movable platen 2 in moving freely and precisely in a specific direction relative to the stationary platen 1. The cylinders 22 each comprise a power unit (not shown) and a retractable rod 221. The power unit is electrically connected to the control unit 441. The retractable rods 221 penetrate the movable platen 2 to allow an end of each of the retractable rod 221 to abut against the stationary platen 1.

Figure 2:
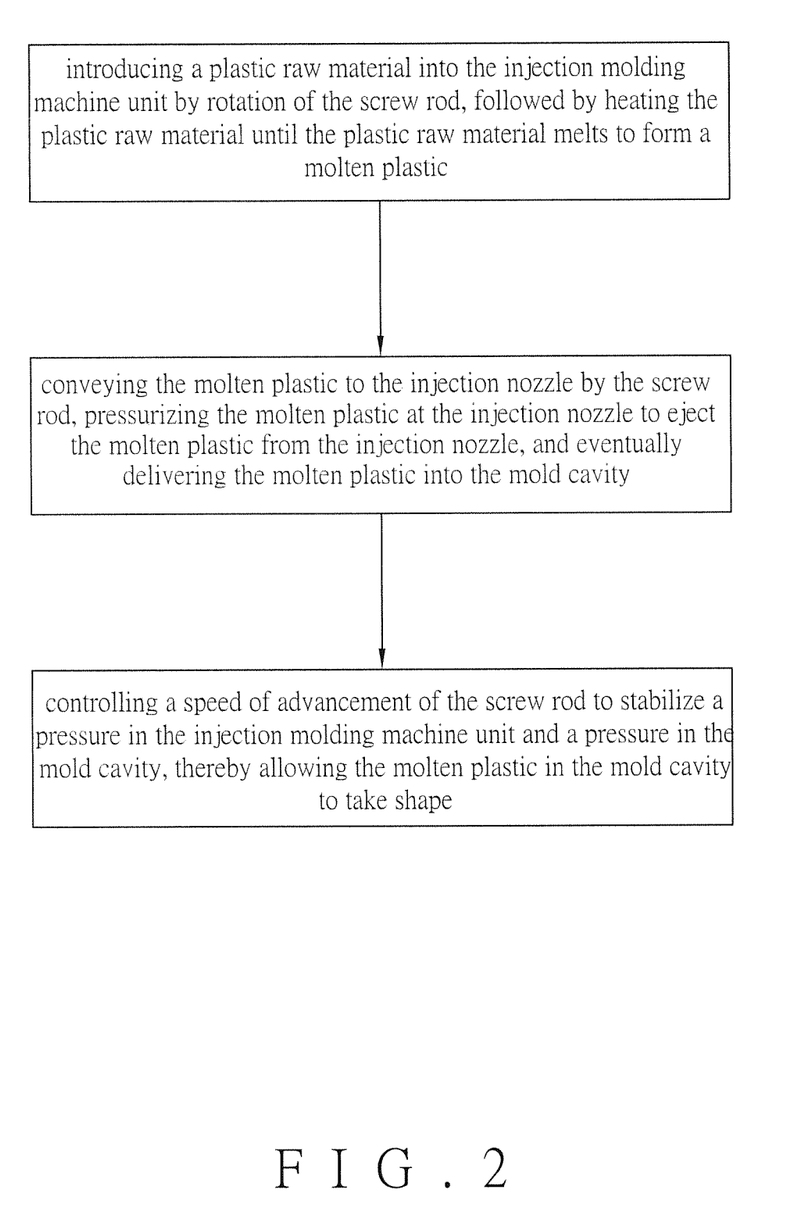
FIG. 2 is a flow chart of an injection method for the simple injection molding machine in accordance with the embodiment of the present invention.

Referring to FIG. 2, there is shown a flow chart of an injection method for the simple injection molding machine of the embodiment of the present invention. The process flow of the injection method comprises the steps of: introducing a plastic raw material into the injection barrel 41 by rotation of the screw rod 43, followed by heating the plastic raw material until the plastic raw material melts to form a molten plastic; conveying the molten plastic to the injection nozzle 411 by the screw rod 43, pressurizing the molten plastic at the injection nozzle 411 to eject the molten plastic from the injection nozzle 411, and eventually delivering the molten plastic into the mold cavity 3; and controlling a speed of advancement of the screw rod 43 to stabilize the pressure in the injection barrel 41 and the pressure in the mold cavity 3, thereby allowing the molten plastic in the mold cavity 3 to take shape.

Figure 3:
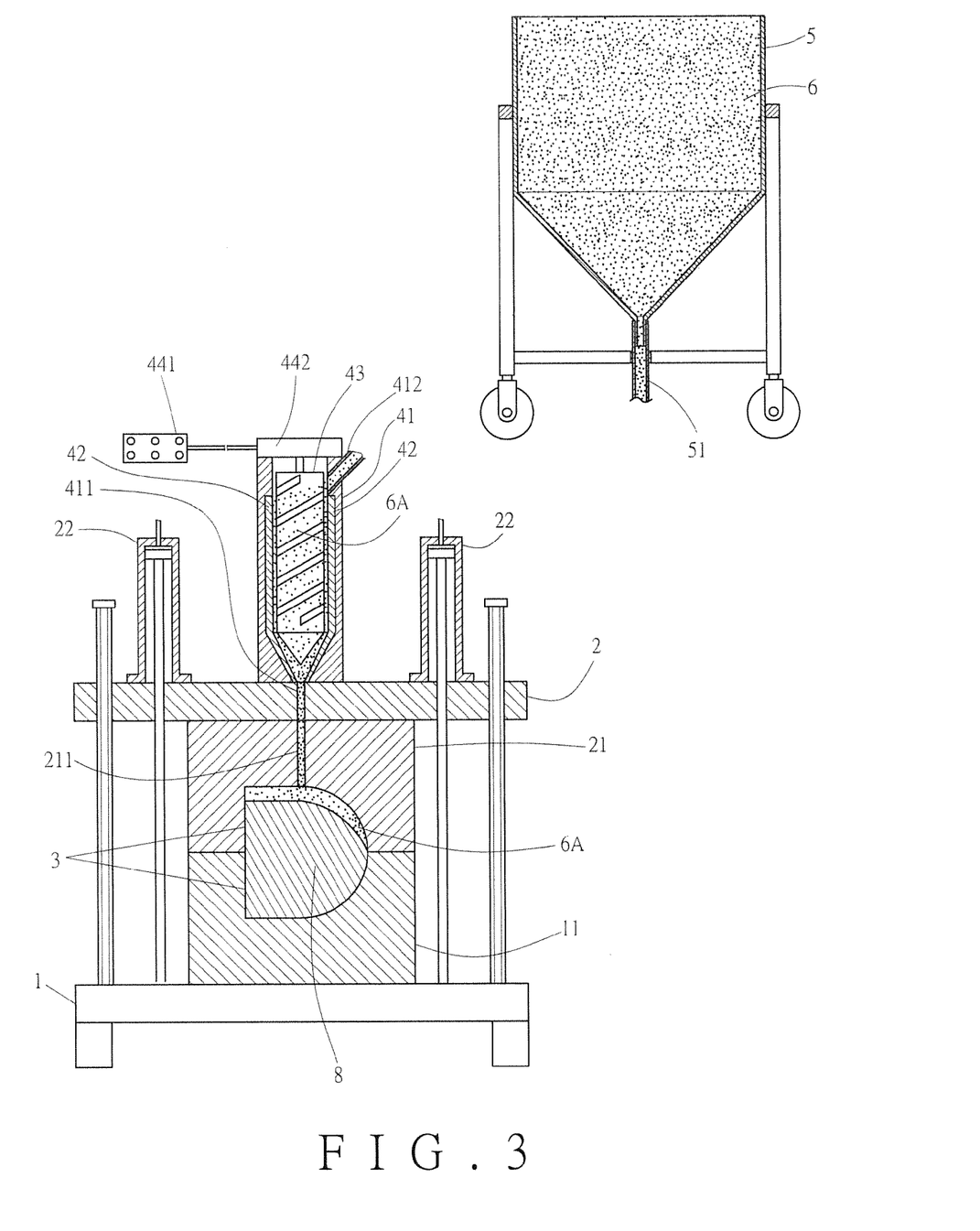
FIG. 3 is a schematic view of the simple injection molding machine in accordance with the embodiment of the present invention.

FIG. 3 further illustrates the operation of the simple injection molding machine of the embodiment of the present invention. The control unit 441 controls the operation of the cylinders 22 and drives the movable platen 2 to move toward the stationary platen 1, such that the second mold core 21 engages tightly with the first mold core 11 to define and enclose the mold cavity 3. The mold cavity 3 contains a metallic material 8. The control unit 441 controls the variable-frequency motor 442 to operate and drive the screw rod 43 to rotate, so as to convey plastic pellets 6 stored in the mobile feed tank 5 to the injection barrel 41 by the pipeline 51 and through the feed port 412 and drive the plastic pellets 6 toward the injection nozzle 411. The heating member 42 heats up the plastic pellets 6 such that the plastic pellets 6 melt and become a molten plastic 6A. The screw rod 43 rotates continuously to not only take in the plastic pellets 6 but also convey the molten plastic 6A to the injection nozzle 411 for injection. Afterward, the molten plastic 6A is introduced into the mold cavity 3 through the runner 211. After the mold cavity 3 has been filled with the molten plastic 6A except the space taken up by the metallic material 8, the pressure in the mold cavity 3 increases instantly to therefore generate a backflow pressure. The control unit 441 controllably reduces the operating speed of the variable-frequency motor 442, such that the rotation of the screw rod 43 slows down, and in consequence the force of pressurizing and delivering the molten plastic 6A equals the force generated from the backflow pressure. Hence, by controllably reducing the rotation speed of the variable-frequency motor 442 to stabilize the pressure in the injection barrel 41 and the pressure in the mold cavity 3, the molten plastic 6A in the mold cavity 3 cools and takes shape steadily, to not only effectuate pressure stabilization but also enhance the tightness of the contact and coupling between the molten plastic 6A and the metallic material 8. Techniques of cooling and taking shape, such as spontaneous cooling, pneumatic cooling, and hydraulic cooling, are well-known among persons skilled in the art. In the embodiment of the present invention, the first mold core 11 and the second mold core 21 each have a plurality of cooling channels (not shown), whereas a cooling device communicates with the cooling channels of the first mold core 11 and the second mold core 21 to form a cooling cycle path for speeding up the cooling and shape-taking of the molten plastic 6A in the mold cavity 3.

Figure 4:
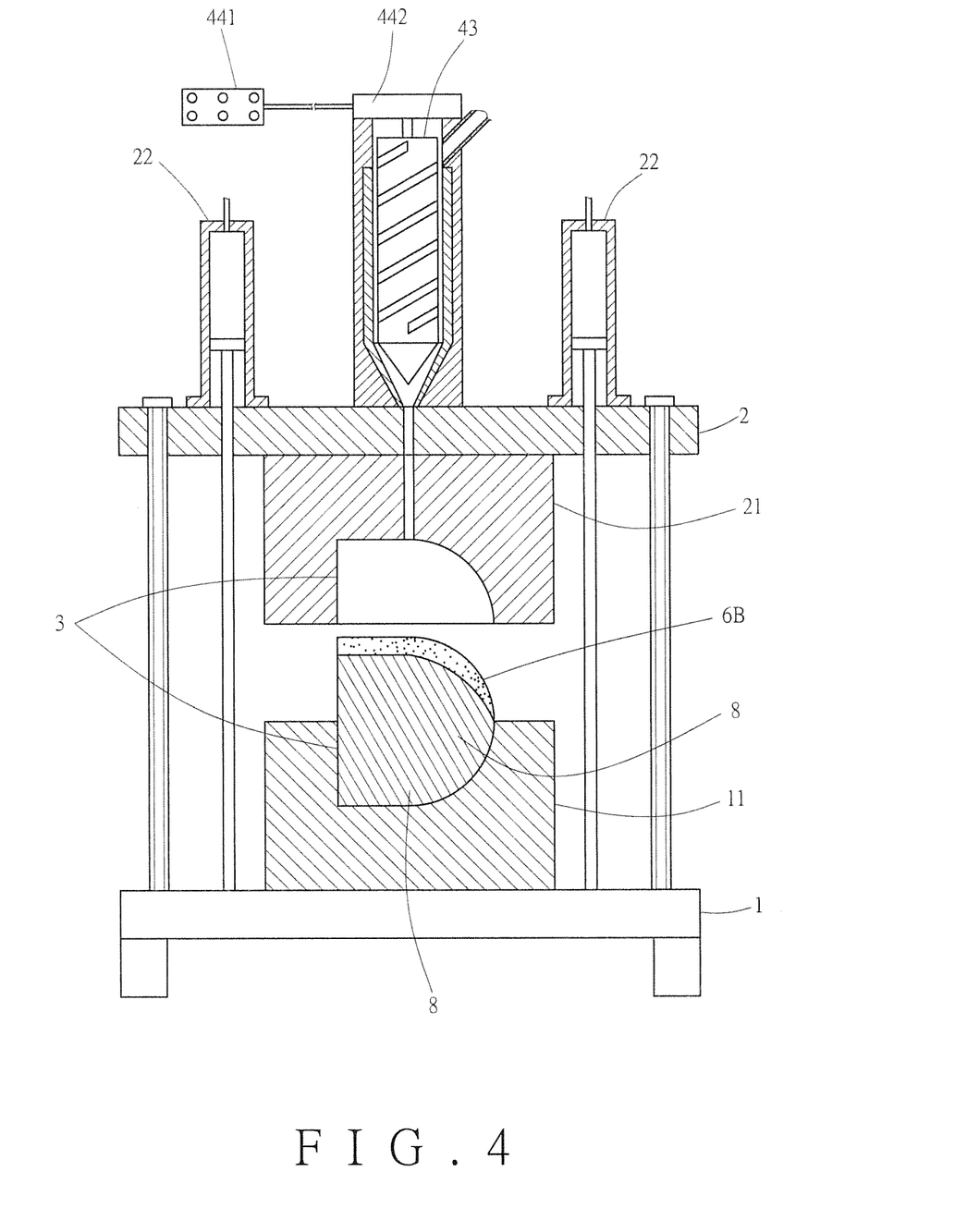
FIG. 4 is another schematic view of the simple injection molding machine in accordance with the embodiment of the present invention.

Referring to FIG. 4, after the molten plastic 6A in the mold cavity 3 has cooled and taken shape to form a plastic blank 6B, the control unit 441 controllably shuts down the variable-frequency motor 442 to stop the rotation of the screw rod 43 and control the operation of the cylinders 22. As a result, the movable platen 2 moves away from the stationary platen 1, such that the second mold core 21 is separated from the first mold core 11, thereby rendering it easy to take out the plastic blank 6B coupled to the metallic material 8 and thus preparing for the subsequent steps of the process flow of the injection method. The simple injection molding machine of the embodiment of the present invention structure repeatedly undergoes the process flow illustrated in FIG. 3 and FIG. 4 to produce blanks of a plastic/metallic composite and thus speed up the production process.

Figure 5:
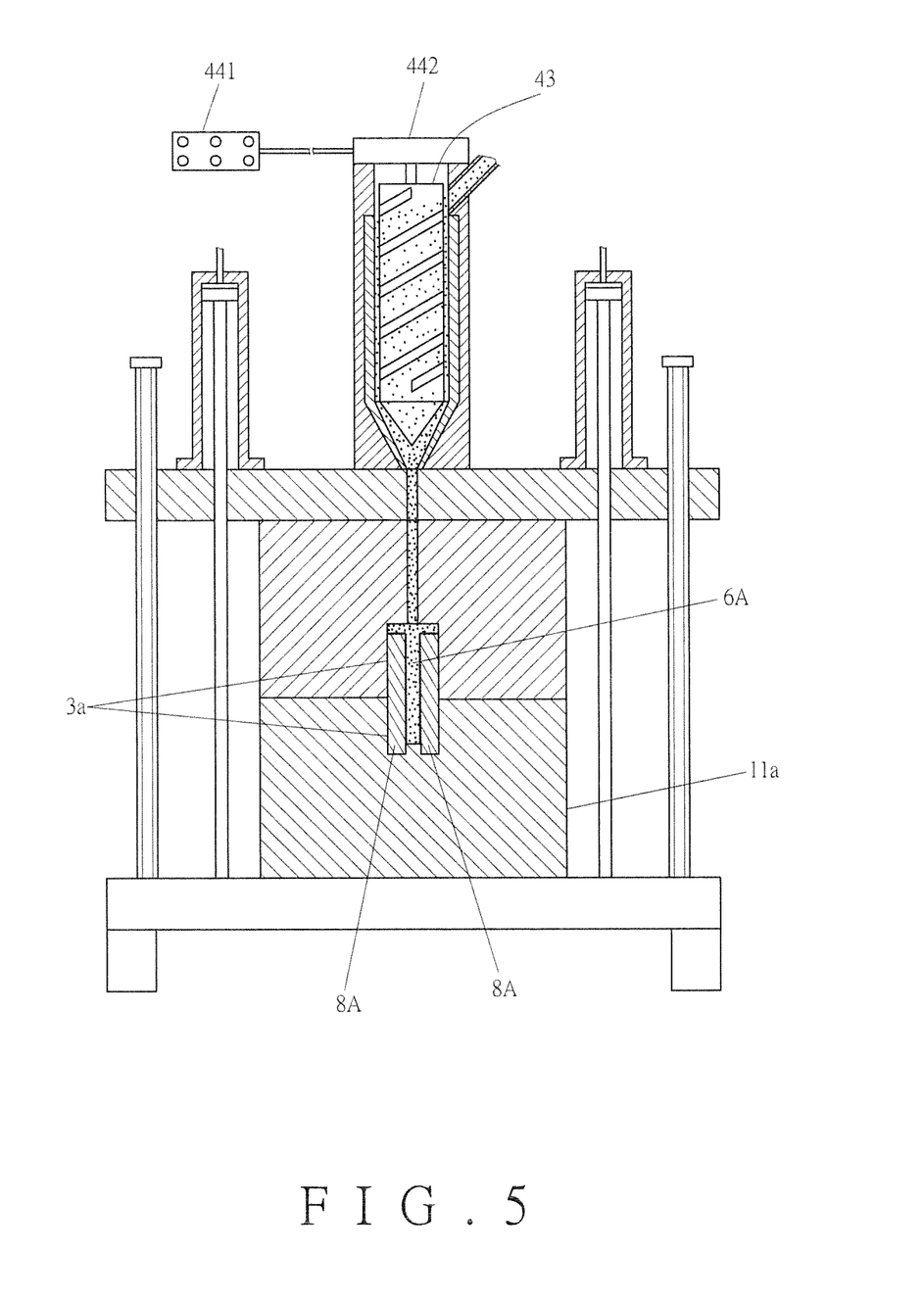
FIG. 5 is a schematic view of a simple injection molding machine in accordance with another embodiment of the present invention.
Figure 6:
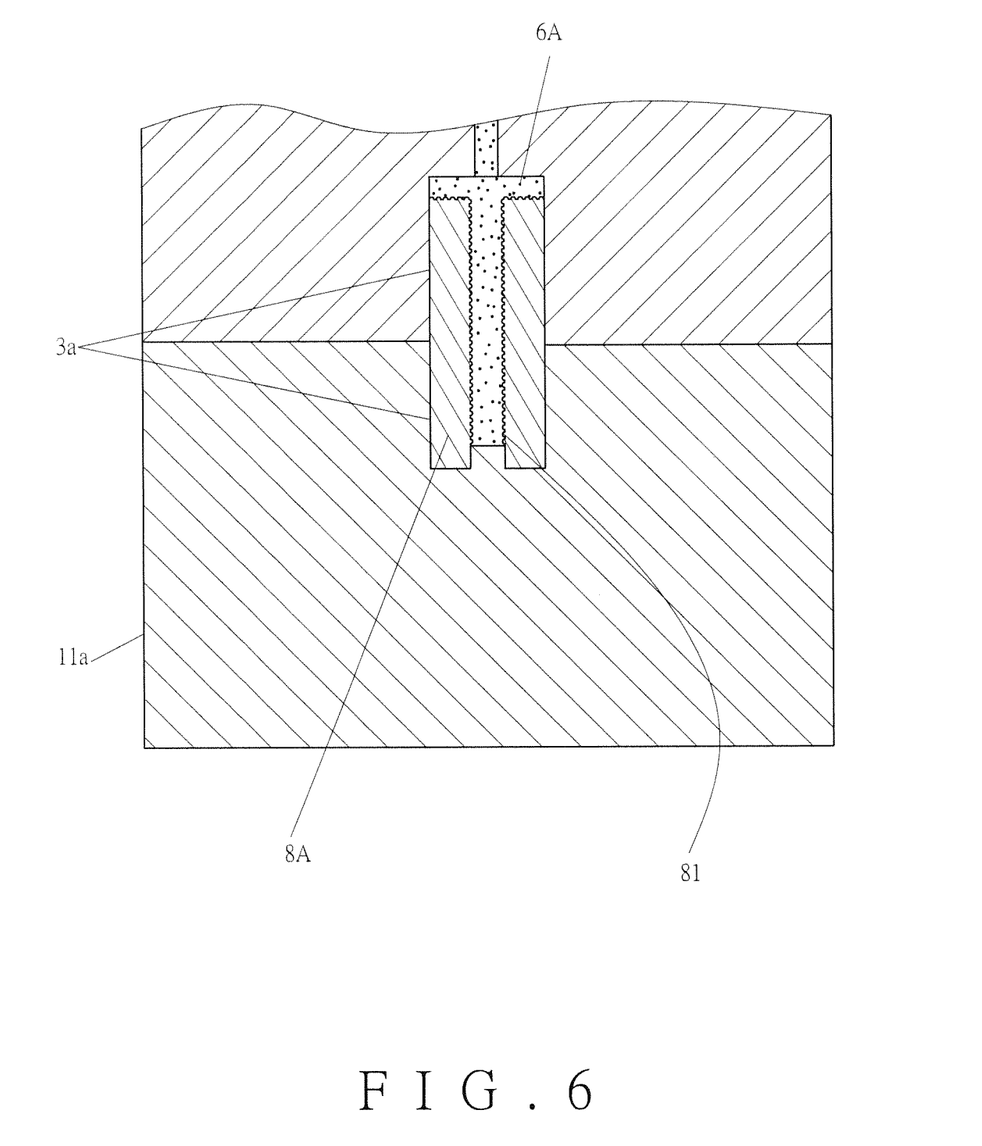
FIG. 6 is a partial enlarged view which shows that a molten plastic and a metal plate shown in FIG. 5 are coupled together.

Referring to FIG. 5, the simple injection molding machine of another embodiment of the present invention structure produces the blanks of the plastic/metallic composite from a metallic material which has received surface micropore treatment to thereby augment the bonding strength of the composite. For example, in the first mold core 11a, there are two metallic materials 8A having received surface micropore treatment and adhering tightly to a wall surface of the first mold core 11a. Likewise, in the injection molding process illustrated with FIG. 3 and FIG. 4, after the mold cavity 3 has been filled with the molten plastic 6A, the control unit 441 controllably reduces the operating speed of the variable-frequency motor 442 to slow down the rotation of the screw rod 43 and thus facilitate gradual pressurization, such that the force of delivering the molten plastic 6A equals the force generated from the backflow pressure. The resultant state of stable pressure enables the mold cavity 3a to maintain a specific level of pressure therein, such that micropores 81 on the surfaces of the two metallic materials 8A are filled fully with the molten plastic 6A, as shown in FIG. 6, and in consequence the molten plastic 6A cools and takes shape steadily to therefore enhance the strength of the bonding between the plastic and the metallic materials.

In conclusion, the present invention is characterized by a screw rod 43 directly pressurizes, injects, and delivers the molten plastic 6A to the mold cavity 3 or 33a, and characterized by controlling the speed of advancement of the screw rod 43 to stabilize the pressure in the injection barrel 41 and the pressure in the mold cavity 3 or 338, so as to simplify conventional injection molding machine structures, such that the simple injection molding machine structure of the present invention is compact, cheap, and mobile, and features ease of maintenance, cost-effectiveness, and high practicability.

The present invention is disclosed above by preferred embodiments. However, persons skilled in the art should understand that the preferred embodiments are illustrative of the present invention only, but should not be interpreted as restrictive of the scope of the present invention. Hence, slight changes and modifications can be made by persons skilled in the art to the aforesaid embodiments without departing from the spirit and scope of the present invention. Accordingly, the legal protection for the present invention should be defined by the appended claims.

What is claimed is:

1. A simple injection molding machine structure, comprising:
    a stationary platen mounted with a first mold core;
    a movable platen corresponding in position to the stationary platen, the movable platen being movable freely relative to the stationary platen and mounted with a second mold core corresponding in position to the first mold core, wherein the first and second mold cores engage with each other to enclose a mold cavity; and
    an injection unit disposed on the movable platen and including an injection barrel, a heating member, a screw rod, and a driving member, the screw rod having an end coupled to the driving member and another end extended into and received in the injection barrel, the heating member being disposed on the injection barrel, the injection barrel having an injection nozzle penetrating the movable platen to communicate with the mold cavity;
    said driving member including a variable frequency motor coupled to said screw rod for controlling the rotational speed of the screw rod in a manner whereby the force of pressurizing a molten plastic being delivered to said mold cavity substantially equals a back pressure produced in the mold cavity as the molten plastic is inserted into the mold cavity.

2. The simple injection molding machine structure of claim 1, further comprising a mobile feed tank, wherein the injection barrel having a feed port opposite the injection nozzle, and the mobile feed tank is in communication with the feed port of the injection barrel through a pipeline.

3. The simple injection molding machine structure of claim 1, wherein the driving member further comprises a control unit in combination with the variable-frequency motor electrically connected to the control unit.

4. The simple injection molding machine structure of claim 1, wherein two cylinders each having a power unit and a retractable rod are disposed at two opposing ends of the movable platen, respectively, the power unit is electrically connected with a control unit, and the retractable rod penetrates the movable platen to allow an end of the retractable rod to abut against the stationary platen.

5. The simple injection molding machine structure of claim 1, wherein the second mold core has therein a runner for the injection nozzle to communicate with the mold cavity.

6. An injection method for a simple injection molding machine structure, applicable to the simple injection molding machine structure of claim 1, the injection method comprising the steps of:
    introducing a plastic raw material into the injection barrel by rotation of the screw rod, followed by heating the plastic raw material until the plastic raw material melts to form a molten plastic;
    conveying the molten plastic to the injection nozzle by the screw rod, pressurizing the molten plastic at the injection nozzle to eject the molten plastic from the injection nozzle, and eventually delivering the molten plastic into the mold cavity; and
    controlling a speed of advancement of the screw rod to stabilize a pressure in the injection barrel and a pressure in the mold cavity, thereby allowing the molten plastic in the mold cavity to take shape.

7. An injection method for a simple injection molding machine structure, applicable to the simple injection molding machine structure of claim 2, the injection method comprising the steps of:
    introducing a plastic raw material into the injection barrel by rotation of the screw rod, followed by heating the plastic raw material until the plastic raw material melts to form a molten plastic;
    conveying the molten plastic to the injection nozzle by the screw rod, pressurizing the molten plastic at the injection nozzle to eject the molten plastic from the injection nozzle, and eventually delivering the molten plastic into the mold cavity; and
    controlling a speed of advancement of the screw rod to stabilize a pressure in the injection barrel and a pressure in the mold cavity, thereby allowing the molten plastic in the mold cavity to take shape.

8. An injection method for a simple injection molding machine structure, applicable to the simple injection molding machine structure of claim 3, the injection method comprising the steps of:
    introducing a plastic raw material into the injection barrel by rotation of the screw rod, followed by heating the plastic raw material until the plastic raw material melts to form a molten plastic;

conveying the molten plastic to the injection nozzle by the screw rod, pressurizing the molten plastic at the injection nozzle to eject the molten plastic from the injection nozzle, and eventually delivering the molten plastic into the mold cavity; and controlling a speed of advancement of the screw rod to stabilize a pressure in the injection barrel and a pressure in the mold cavity, thereby allowing the molten plastic in the mold cavity to take shape.

9. An injection method for a simple injection molding machine structure, applicable to the simple injection molding machine structure of claim 4, the injection method comprising the steps of:

introducing a plastic raw material into the injection barrel by rotation of the screw rod, followed by heating the plastic raw material until the plastic raw material melts to form a molten plastic;

conveying the molten plastic to the injection nozzle by the screw rod, pressurizing the molten plastic at the injection nozzle to eject the molten plastic from the injection nozzle, and eventually delivering the molten plastic into the mold cavity; and controlling a speed of advancement of the screw rod to stabilize a pressure in the injection barrel and a pressure in the mold cavity, thereby allowing the molten plastic in the mold cavity to take shape.

10. An injection method for a simple injection molding machine structure, applicable to the simple injection molding machine structure of claim 5, the injection method comprising the steps of:

introducing a plastic raw material into the injection barrel by rotation of the screw rod, followed by heating the plastic raw material until the plastic raw material melts to form a molten plastic;

conveying the molten plastic to the injection nozzle by the screw rod, pressurizing the molten plastic at the injection nozzle to eject the molten plastic from the injection nozzle, and eventually delivering the molten plastic into the mold cavity; and controlling a speed of advancement of the screw rod to stabilize a pressure in the injection barrel and a pressure in the mold cavity, thereby allowing the molten plastic in the mold cavity to take shape.

* * * * *